(12) United States Patent
Yahagi et al.

(10) Patent No.: US 7,262,805 B2
(45) Date of Patent: Aug. 28, 2007

(54) FOCUS DETECTING SYSTEM

(75) Inventors: Satoshi Yahagi, Fuchu (JP); Tadashi Sasaki, Okegawa (JP)

(73) Assignee: Fujinon Corporation, Saitama (JP)

( * ) Notice: Subject to any disclaimer, the term of this patent is extended or adjusted under 35 U.S.C. 154(b) by 889 days.

(21) Appl. No.: 10/358,239

(22) Filed: Feb. 5, 2003

(65) Prior Publication Data

US 2003/0174231 A1   Sep. 18, 2003

(30) Foreign Application Priority Data

Mar. 13, 2002   (JP)  ............................ 2002-068775

(51) Int. Cl.
H04N 5/232   (2006.01)
(52) U.S. Cl. .................... 348/350; 348/354
(58) Field of Classification Search ............. 348/345, 348/349, 350
See application file for complete search history.

(56) References Cited

U.S. PATENT DOCUMENTS 4,307,947 A * 12/1981 Jyoujiki ....................... 396/119
4,341,953 A *  7/1982 Sakai et al. ................... 250/204
4,558,367 A * 12/1985 Urata et al. .................. 348/350
5,212,516 A *  5/1993 Yamada et al. .............. 348/354
5,432,331 A *  7/1995 Wertheimer ................ 250/201.7
5,798,793 A *  8/1998 Tanaka ........................ 348/347
2005/0195310 A1* 9/2005 Yajima et al. .............. 348/345

FOREIGN PATENT DOCUMENTS

| JP | S55-76312 | 6/1980 |
| JP | S58-98710 | 6/1983 |
| JP | S58-158618 | 9/1983 |
| JP | S59-86015 | 5/1984 |
| JP | H7-60211 | 6/1995 |
| JP | H8-50227 | 2/1996 |

\* cited by examiner

*Primary Examiner*—John M. Villecco
*Assistant Examiner*—Dillon Durnford-Geszvain
(74) *Attorney, Agent, or Firm*—Arnold International; Jon W. Henry; Bruce Y. Arnold

(57) ABSTRACT

A focus detecting system for determining the focus state of an imaging lens, such as a camera lens, is disclosed. Object light not forming an image for image production is deflected along an optical axis through a relay lens to a focus state detection unit that includes image detecting elements with light receiving surfaces that are equidistant in front of and behind a position conjugate with a light receiving surface for image production. Either the relay lens or the focus state detection unit is moveable along the optical axis to vary how far the light receiving surfaces are out of focus. A diaphragm opening of the imaging lens determines if and by how much the relay lens and focus state detection unit are relatively moved. Evaluation values of the out of focus amount are compared in order to control focusing of the imaging lens.

18 Claims, 10 Drawing Sheets

FOCUS DETECTING SYSTEM

BACKGROUND OF THE INVENTION

A focus detecting system in imaging devices, such as video cameras and similar cameras, conventionally uses a so-called hill-climbing mode to provide autofocus (hereinafter AF) imaging. The hill-climbing mode integrates high frequency components of image signals in a specified region (focused region) from image signals (brightness signals) that are obtained by a focus state detecting element in order to provide a signal that is an evaluation value indicative of the sharpness of the image at a receiving surface of the focus state detecting element. In such an AF system, the imaging lens of the imaging device is driven to shift the focus position to seek the maximum evaluation value, achieving a focused state at the light receiving surface or surfaces of one or more image detecting elements for image production that are located at a focused image plane of an image pickup unit. Because the hill-climbing mode seeks the maximum evaluation value by moving the imaging lens, the process of focusing the imaging lens is disadvantageously slow.

In order to solve problems of the hill-climbing mode, Japanese Laid-Open Patent Application S55-76312 and Japanese Patent No. H07-060211 propose focus detecting methods for detecting three focus states of an imaging lens, namely, front focus, rear focus, or in-focus, by using plural focus state detecting elements having different optical path lengths to their light receiving surfaces. The method uses a pair of focus state detecting elements, with one focus state detecting element having an optical path to its light receiving surface that is shorter than the optical path to a light receiving surface of an image detecting element for image production and the other focus state detecting element having an optical path to its light receiving surface that is longer than the optical path to a light receiving surface of an image detecting element for image production. Evaluation values obtained by the pair of focus state detecting elements are compared and their relative magnitudes are used to determine whether focus is achieved at a light receiving surface of an image detecting element for image production. The method provides not only an evaluation of whether an image is in focus but also, when the image is not in focus, whether it is in a state of front focus or rear focus. This helps obtain faster focusing.

Another conventional focus detecting system for imaging devices, such as video cameras and similar cameras, uses a wobbling process. The wobbling process periodically vibrates (wobbles) the focusing lens or a focus state detecting element, and during the wobbling, fluctuations in evaluation values are used to evaluate focusing. However, the wobbling process disadvantageously reduces image quality due to the effects of the instability related to the wobbling.

To solve problems of the wobbling process, Japanese Laid-Open Patent Application H08-50227 proposes a focus detecting method in which a separate optical path is formed that diverges from the object light that enters an image detecting element for image production, and the object light on the diverged optical path enters a focus state detecting element that is different from the image detecting element for image production. The focus state detecting element is wobbled in directions along the optical axis in order to detect the focus state of the image.

Focus detecting processes in which two focus state detecting elements are used, as described in Japanese Laid-Open Patent Application S55-76312, have the problem that the difference between the evaluation values obtained by the two focus state detecting elements is negligible when the imaging lens is greatly out of focus, and, therefore, if the difference is used to detect the focus state and to control focusing, the AF focusing adjustment fails. On the other hand, the wobbling process disclosed in Japanese Laid-Open Patent Application H08-50227 enables focusing adjustment by using larger amplitudes of wobbling when the focus position of the camera lens is far from the in-focus position. However, larger amplitudes of wobbling disadvantageously lead to a longer focusing time.

Evaluation values vary depending upon the diaphragm settings, that is, the setting of the opening of the diaphragm, that determine the aperture stop (F-number) of the camera lens. For larger aperture diaphragm settings, that is, larger openings of the diaphragm, providing a greater difference in optical path lengths for the pair of focus state detecting elements ensures very precise focusing adjustment. However, the focusing adjustment process disclosed in Japanese Laid-Open Patent Applications S55-76312 and H07-60211 uses a pair of focus state detecting elements with a fixed difference in the optical path lengths. Therefore, highly precise focusing adjustment at all diaphragm openings or settings is not realized.

BRIEF SUMMARY OF THE INVENTION

The present invention relates to an AF system that controls the focus of an imaging lens by moving a relay lens on a separate optical axis relative to the focus state detecting elements and by determining the focus state of different focus state detecting elements at different relative positions of the relay lens and the focus state detecting elements in order to determine the focus state of the imaging lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Two preferred embodiments of the autofocus system of the present invention will now be individually described with reference to the drawings.

EMBODIMENT 1

Figure 1:
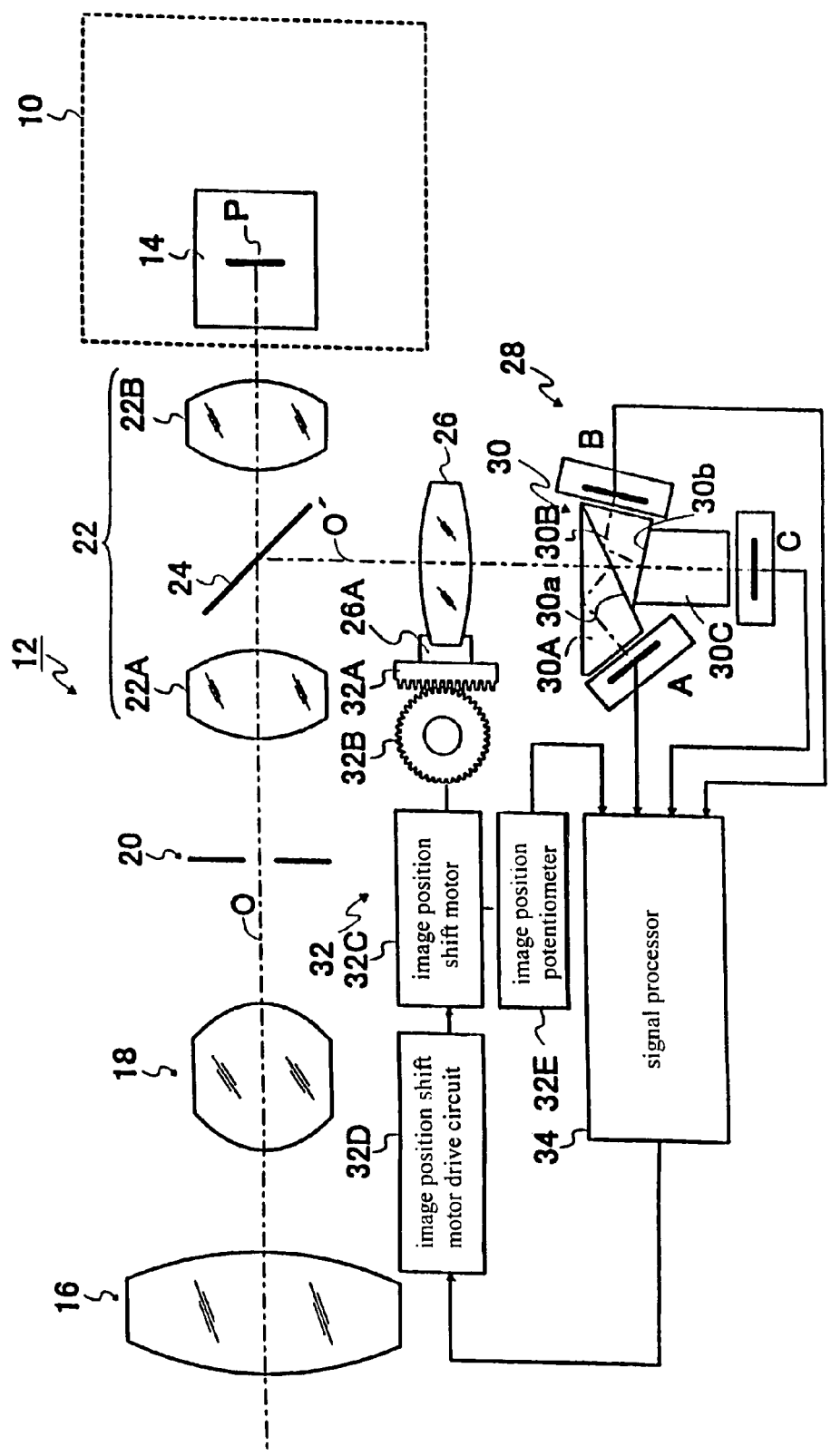
FIG. 1 shows a cross-sectional view of a camera using an AF system of Embodiment 1 of the present invention.

FIG. 1 shows a cross-sectional view of a camera using an AF system according to Embodiment 1 of the present invention. As shown in FIG. 1, the camera system, or imaging system, includes a camera body 10 and a camera lens (i.e., imaging lens 12). The camera body 10 includes an image pickup unit 14 with at least one image detecting element for image production and provides for outputting or storing in memory media image signals of a specified format with appropriate circuits. The imaging lens 12 is detachably mounted on the camera body 10 by mating mounts on the imaging lens 12 and the camera body 10.

As shown in FIG. 1, the imaging lens 12 includes a focusing lens group 16, a zoom lens group 18, an iris 20, and a relay lens group 22 as is known in the art. The relay lens group 22 includes, in order from the object side of the imaging lens 12, a front relay lens 22A, a partially reflecting mirror 24, and a rear relay lens 22B. The partially reflecting mirror 24 separates object light for focus state detection from light directed toward the image pickup unit 14. The partially reflecting mirror 24 is inclined at approximately forty-five degrees to the optical axis O of the imaging lens 12. The partially reflecting mirror 24 is located so as to reflect the object light that is transmitted through the front relay lens 22A at a right angle to separate that object light from the image forming object light that passes to the image pickup unit 14. That is, the object light transmitted through the partially reflecting mirror 24 exits from the rear of the imaging lens 12 as image forming object light and then enters the image pickup unit 14 of the camera body 10. The configuration of the image pickup unit 14 will not be discussed in detail, since its configuration is not part of Embodiment 1 of the present invention. However, it is noted that light entering the image pickup unit 14 is separated into red, green, and blue light beams by, for example, a color separating optical system, and each different color light beam is incident on a light receiving surface that is at the focused image plane P on the optical axis O of the imaging lens 12 or at an equivalent focused image plane (not shown) of a different image detecting element for image production. This provides the detection of light from which color images may be broadcast or recorded.

The object light that is reflected by the partially reflecting mirror 24 proceeds along the optical axis O' orthogonal to the optical axis O and enters a focus state detection unit 28 after passing through a relay lens 26. In Embodiment 1 of the present invention, relay lens 26 is movable along the optical axis O' while keeping the image pickup unit 14 fixed in position to assist in detecting the focus state of the imaging lens 12. Therefore, relay lens 26 is referred to as an image position shift lens 26.

As shown in FIG. 1, the focus state detection unit 28 include a beamsplitter 30 that divides the object light that it receives equally into three parts and directs each of these three parts in a different direction toward a light receiving surface of a different focus state detecting element A, B, or C. The beamsplitter 30 includes three prisms 30A, 30B, and 30C. The object light that is separated from the image forming object light by the partially reflecting mirror 24 travels along the optical axis O' and enters the first prism 30A. That light is partly reflected and partly transmitted at a partially reflecting surface 30a of the first prism 30A. The light reflected at surface 30a is incident on the light receiving surface at an image detecting plane of the focus state detecting element A and the light that is transmitted through surface 30a enters the second prism 30B.

The light that enters the second prism 30B is partly reflected and partly transmitted at the partially reflecting surface 30b of the second prism 30B. The light reflected at surface 30b is incident on the light receiving surface at an image detecting plane of the second focus state detecting element B and the light transmitted through surface 30b enters the third prism 30C. The light that enters the third prism 30C is transmitted and is incident onto the light receiving surface at an image detecting plane of a third focus state detecting element C.

As described above, the beamsplitter 30 divides the object light for focus state detection into three equal parts and directs that light toward the light receiving surfaces at image detecting planes of the focus state detecting elements A, B, and C. The focus state detecting elements A, B, and C may use CCD's that are used for producing monochrome images. That is, the focus state detecting elements do not need to receive different color images because they are being used for focus state detection.

Figure 2:
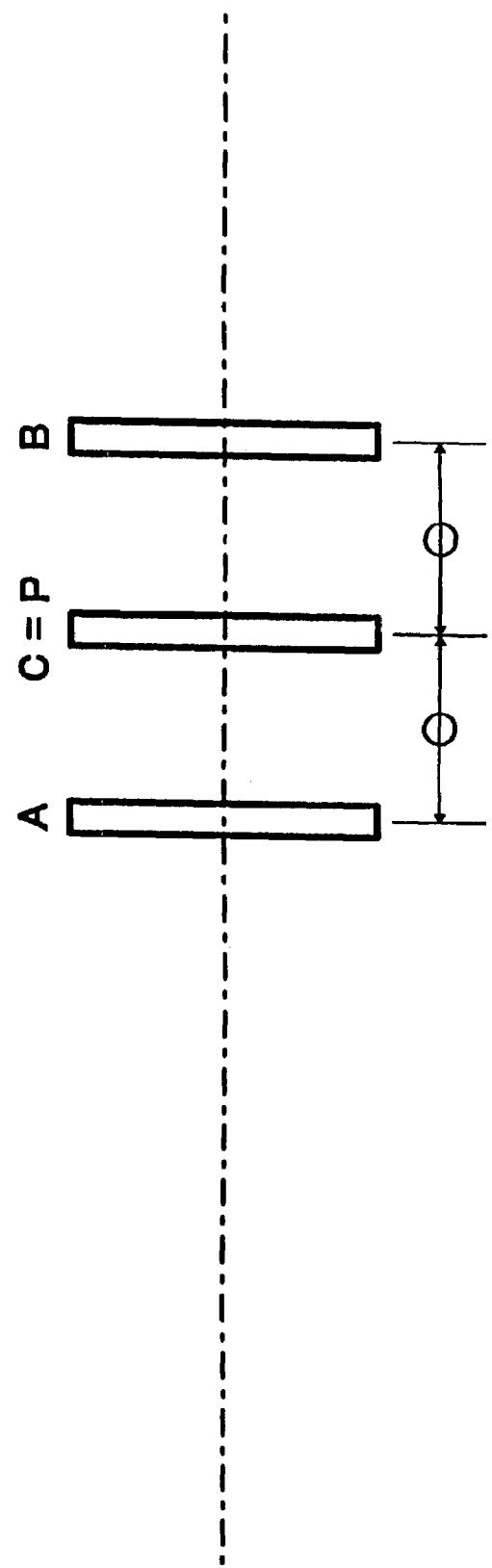
FIG. 2 shows, for purposes of explanation of operation only, the image detecting planes for three focus state detecting elements being drawn as positioned along the same straight line; however, in actuality these image detecting planes are positioned, for example, as shown in FIG. 1.

FIG. 2 shows the image detecting planes for the focus state detecting elements A, B, and C expressed on the same straight line representing an alignment of their optical axes. As shown in FIG. 2, the optical path lengths of the object beams for focus state detection that are incident onto each focus state detecting element A, B, and C are different, with A having the shortest optical path length of the three, C having the next longer optical path length, and B having the longest optical path length of the three. As shown in FIG. 2, the location of the image detecting plane where the light receiving surface of focus state detecting element C is located halfway between the image detecting planes where the light receiving surfaces of the focus state detecting elements A and B are located, indicating that the differences in the optical path lengths between the image detecting planes of the focus state detecting elements A and C and between the image detecting planes of the focus state detecting elements B and C are equal. In other words, the image detecting planes of the first and second focus state detecting elements A and B are positioned in parallel, and are equidistant in front of and in back of planes that are conjugate to the image detecting plane of the third focus state detecting element C.

Additionally, as indicated by the notation "C=P" in FIG. 2, the light receiving surface at the image detecting plane of the third focus state detecting element C is at a position that is conjugate to the light receiving surface at the image detecting plane of the image detecting element for image production that is at the focused image plane P of the image pickup unit 14 in the camera body 10. That is, the object light that enters the imaging lens 12 follows an optical path to focused image plane P that is equal in length to the optical path to the image detecting plane of the focus state detecting element C and thus the image detecting plane of the focus state detecting element C and focused image plane P are optically equivalent, and the image detecting planes of the first and second focus state detecting elements A and B, where their light receiving surfaces are located, are positioned the same distance in front of and in back of positions conjugate to the focused image plane P.

The image position shift lens 26 (FIG. 1) focuses an image formed by the focus state object light on the light receiving surface of the focus state detecting element C when the imaging lens 12 is in focus. The image position shift lens 26 is moved forward and backward along the optical axis O' by an image position shift lens driving mechanism 32. This movement shifts the image position of the focus state object light. In general, the image position shift lens 26 is at a "reference position" where it forms an image of the focus state object light at the optically equivalent position to that of the image forming object light at focused image plane P. Therefore, when the image position shift lens 26 is at the reference position and an object image is formed by the imaging lens 12 on an image detecting plane, for example, focused image plane P, of an image detecting element for image production in image pickup unit 14, the same object image is formed on the image detecting plane of the third focus state detecting element C. As image position shift lens 26 moves forward and backward from the reference position along the optical axis O', the image position shift lens 26 shifts the positions of the images formed by that lens.

As shown in FIG. 1, the image position shift lens driving mechanism 32 includes a rack 32A, a pinion 32B, an image position shift motor 32C, an image position shift motor driving circuit 32D, and an image position shift potentiometer 32E. The rack 32A is linked to a lens frame 26A that holds the image position shift lens 26 in a manner that allows free forward and backward movement. The pinion 32B, which is engaged with the rack 32A, is driven by the image position shift motor 32C to shift the image position shift lens 26 forward and backward along the optical axis O'.

The image position shift motor 32C operates based on driving signals from the image position shift motor driving circuit 32D. The image position shift motor driving circuit 32D drives the image position shift motor 32C based on control signals provided by a signal processor 34. The image position shift potentiometer 32E detects the position of the image position shift lens 26 and outputs position data to the signal processor 34 via an A/D converter 44 (see FIG. 3).

Figure 3:
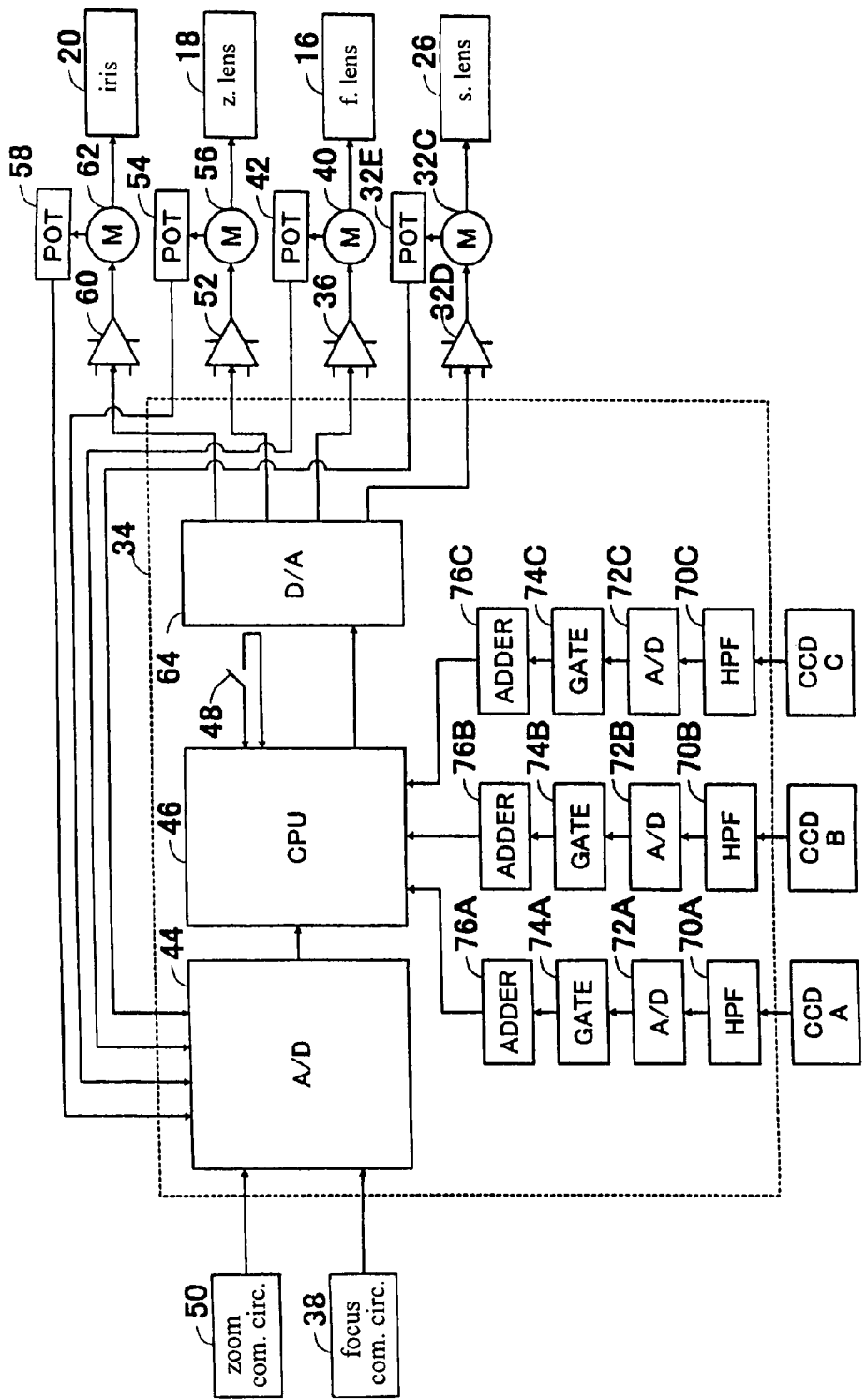
FIG. 3 is a schematic block diagram of the electrically connected elements of an AF system of Embodiment 1 of the present invention.

As shown in FIG. 3, which is a schematic block diagram of the electrically connected elements of an AF system of Embodiment 1 of the present invention, image signals that are detected by the focus state detecting elements A, B, and C are supplied to the signal processor 34. The signal processor 34 evaluates the focus state of the imaging lens 12 based on the image signals obtained from the focus state detecting elements A, B, and C, as will be described later. Then, control signals based on the evaluation of the focus state are supplied to a focusing motor driving circuit 36 so as to AF control the imaging lens 12.

The imaging lens 12 is manually focused (MF) in general and is AF controlled only when the AF switch is ON.

In the MF control mode, the signal processor 34 provides control signals to the focusing motor driving circuit 36 based on operation of a focus command circuit 38 so as to control the imaging lens 12 for focusing. The focus command circuit 38 provides focus command data to the signal processor 34 that indicates the position of the focusing lens 16 according to the amount of rotation of a focusing knob (not shown) provided in a free rotational manner. The signal processor 34 provides the focus command data to a CPU 46 from the focus command circuit 38 as shown in FIG. 3. The CPU 46 calculates the position of the focusing lens 16 in terms of the shift amount of the focusing lens 16 from the reference position based on the focus command data and the position data of the focusing lens 16 that is provided from the focusing potentiometer 42 via the A/D converter 44, and outputs a control signal for the focusing motor 40 to the focusing motor driving circuit 36 via a D/A converter 64.

The signal processor 34 outputs a control signal to a zoom motor driving circuit 52 to control the imaging lens 12 for zooming based on operation information of a zoom command circuit 50 that controls the imaging lens 12 for zooming. The zoom command circuit 50 outputs to the signal processor 34 zoom command data that indicates the shift amount of the zoom lens according to the direction and amount of rotation of a zoom ring provided in a free rotational manner. The signal processor 34 provides the zoom command data to the CPU 46 via the A/D converter 44. The CPU 46 calculates the shift amount of the zoom lens 18 (FIG. 1) based on the acquired zoom command data and the position data of the zoom lens 18 that is provided from a zoom potentiometer 54 via the A/D converter 44, and outputs a control signal for the zoom motor 56 to the zoom motor driving circuit 52 via the D/A converter 64.

In addition, the CPU 46 of the signal processor 34 calculates the driving amount of an iris motor 62 based on diaphragm opening or setting data provided from an iris potentiometer 58 via the A/D converter 44 and an iris control signal provided from the camera body 10, and outputs an iris control signal for the iris motor 62 to an iris motor control circuit 60 via the D/A converter 64.

The focus detecting process in the signal processor 34 will be described next. As shown in FIG. 3, the object images detected by the focus state detecting elements A-C are output as video signals of a specified format. They are converted into evaluation value signals $V_A$, $V_B$, and $V_C$ that indicate image sharpness (image contrast) by processing through high pass filters 70A-70C, A/D converters 72A-72C, gate circuits 74A-74C, and adders 76A-76C. The output signals from the adders 76A-76C are supplied to the CPU 46.

The procedure for obtaining the evaluation values $V_A$, $V_B$, and $V_C$ is described next. The focus state detecting elements, A-C, of this embodiment are monochrome CCDs for black and white images. Video signals from the respective focus state detecting elements A-C indicate the brightness of the pixels related to a real image of an object viewed by the camera. Video signals from the respective focus state detecting elements A-C are first supplied to the high pass filters 70A-70C to extract high frequency components. The high frequency components extracted by the high pass filters 70A-70C are converted to digital signals by the A/D converters 72A-72C. Among the digital signals for one real image (one field) picked up by the focus state detecting elements A-C, only the digital signals corresponding to pixels in a specified focused area, for example, a central portion of a real image, are extracted by the gate circuits 74A-74C, and values of the extracted digital signals are added by the adders 76A-76C. This produces the sums of the high frequency components of the video signals within the specified focused area. In this way, the evaluation values $V_A$-$V_C$ that indicate image sharpness within the specified focused area are obtained.

A synchronizing signal generation circuit (not shown) provides the focus state detecting elements A-C and the circuits including the gate circuits 74A-74C with various synchronizing signals so as to synchronize the signals with one another. The synchronizing signal generation circuit further provides the CPU 46 with vertical synchronizing signals (V signals) for every field of video signals.

The CPU 46 evaluates the imaging lens 12 for current focusing on the image detecting plane for image production (focused image plane P) of the image detecting element for image production based on the obtained evaluation values $V_A$-$V_C$.

Figure 4:
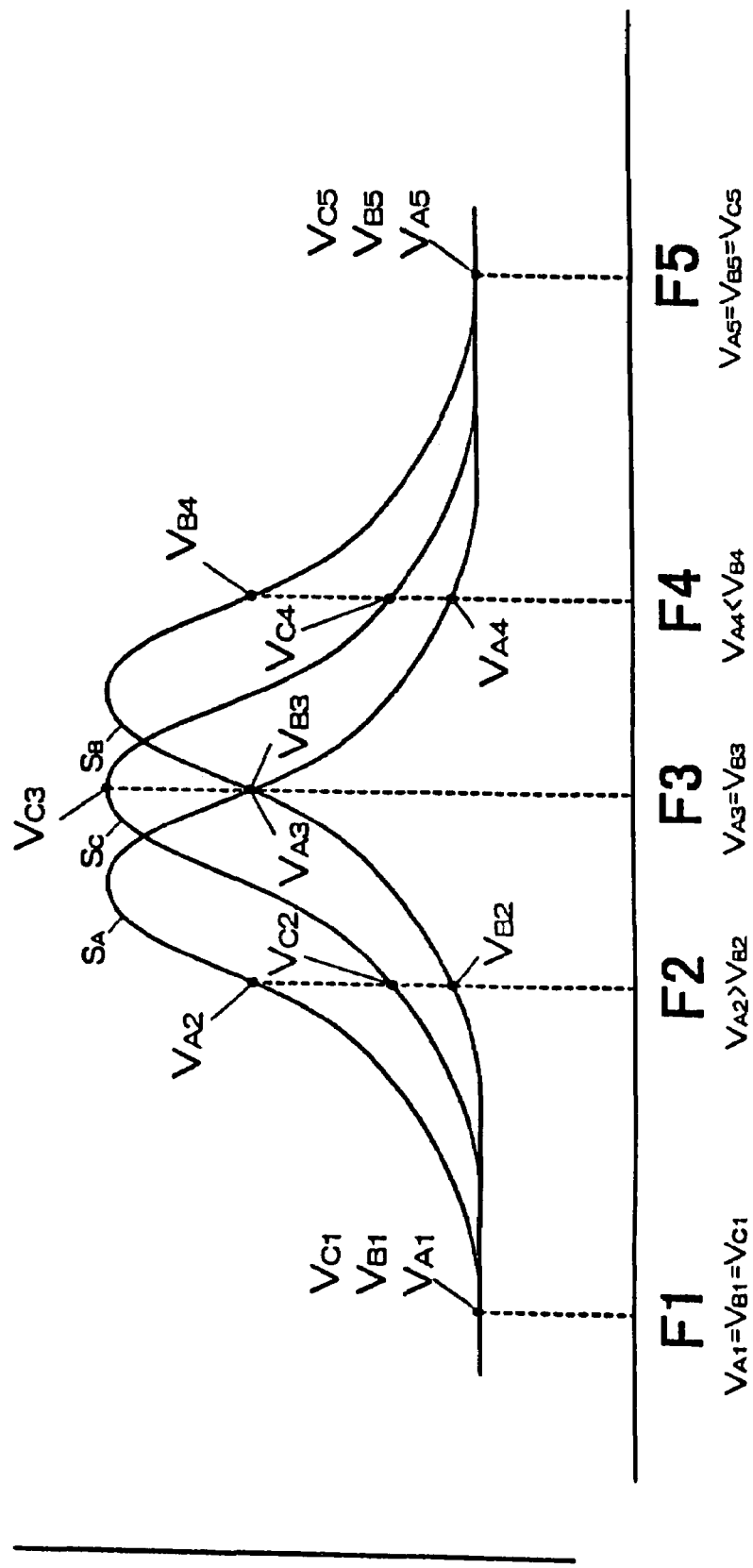
FIG. 4 is a graph with focus position as the X-axis and evaluation values as the Y-axis of an AF system of Embodiment 1 of the present invention.

The process of detecting the focus state of the imaging lens 12 by the CPU will now be described. FIG. 4 is a graph with focus position as the X-axis and evaluation values as the Y-axis for imaging lens 12 that shows evaluation values in relation to focus positions when an object is imaged. The curves $S_A$, $S_B$, and $S_C$ represent evaluation values obtained by the focus state detecting elements A-C, respectively, in relation to focus position. Here, the image position shift lens 26 is at the reference position discussed previously.

The third focus state detecting element C is at an optically equivalent position to the image detecting element for image production, that is, their image detecting planes are in optically conjugate positions. Therefore, in FIG. 4, the in-focus point is F3 where the curve $S_C$ has the largest, absolute maximum, evaluation value. When the focus position of the imaging lens 12 is set for the in-focus point F3, the evaluation values obtained by the focus state detecting elements A, B, and C are $V_{A3}$, $V_{B3}$, and $V_{C3}$ on the curves $S_A$, $S_B$, and $S_C$ at F3. As shown in FIG. 4, the evaluation values $V_{A3}$ and $V_{B3}$ obtained from the first and second focus state detecting elements A and B are equal and the evaluation value $V_{C3}$ obtained from the third focus state detecting element C is different ($V_{A3}$=$V_{B3}$, $V_{A3}$<$V_{C3}$, $V_{B3}$<$V_{C3}$). Thus, it can be determined that the imaging lens 12 is at the in-focus point F3 when the evaluation values $V_{A3}$ and $V_{B3}$ obtained from the first and second focus state detecting elements A and B are equal and the evaluation value $V_{C3}$ obtained from the third focus state detecting element C is different.

When the focus position of the imaging lens 12 is at F2 on the close-up side of the in-focus point F3, the evaluation values obtained from the focus state detecting elements A, B, and C are $V_{A2}$, $V_{B2}$, and $V_{C2}$ on the curves $S_A$, $S_B$, and $S_C$ at F2. As shown in FIG. 4, the evaluation value $V_{A2}$ obtained from the first focus state detecting element A is larger than the evaluation value $V_{B2}$ obtained from the second focus state detecting element B ($V_{A2}$>$V_{B2}$). Thus, it can be determined that the focus position of the imaging lens 12 is on the close-up side of the in-focus point F3, that is, in front focus, when the evaluation value $V_{A2}$ obtained from the first focus state detecting element A is larger than the evaluation value $V_{B2}$ obtained from the second focus state detecting element B.

When the focus position of the imaging lens 12 is at F4 that is on the infinity side of the in-focus point F3, the evaluation values obtained from the focus state detecting elements A, B, and C are $V_{A4}$, $V_{B4}$, and $V_{C4}$ on the curves $S_A$, $S_B$, and $S_C$ at F4. As shown in FIG. 4, the evaluation value $V_{A4}$ obtained from the first focus state detecting element A is smaller than the evaluation value $V_{B4}$ obtained from the second focus state detecting element B. Thus, it can be determined that the focus position of the imaging lens 12 is set on the infinity side of the in-focus point F3, that is, in rear focus, when the evaluation value $V_{A4}$ that is obtained from the first focus state detecting element is smaller than the evaluation value $V_{B4}$ that is obtained from the second focus state detecting element B.

When the focus position of the imaging lens 12 is at F1 that is farther on the close-up side of the point F2, the evaluation values $V_{A1}$ and $V_{B1}$ obtained from the first and second focus state detecting elements A and B are equal. In this case, the evaluation value $V_{C1}$ that is obtained from the third focus state detecting element C is the same as $V_{A1}$ and $V_{B1}$ ($V_{A1}$=$V_{B1}$=$V_{C1}$). Thus, it can be determined that the focus position of the imaging lens 12 is very far from the in-focus point F3, that is, the imaging lens 12 is significantly out of focus, when all the evaluation values $V_{A1}$-$V_{C1}$ obtained from the respective focus state detecting elements A-C are equal.

When the focus position of the imaging lens 12 is at F5, that is farther on the infinity side of the point F4, the evaluation values $V_{A5}$ and $V_{B5}$ obtained from the first and second focus state detecting elements A and B are equal. In this case, the evaluation value $V_{C5}$ obtained from the third focus state detecting element C is the same as $V_{A5}$ and $V_{B5}$ ($V_{A5}$=$V_{B5}$ $V_{C5}$). Thus, it can be determined that the focus position of the imaging lens 12 is very far from the in-focus point F3, that is, the imaging lens 12 is significantly out of focus, when all the evaluation values $V_{A5}$-$V_{C5}$ obtained from the respective focus state detecting elements A-C are equal.

When all of the evaluation values $V_A$-$V_C$ obtained from the focus state detecting elements A-C are equal as described above, it is known that the focus position of the imaging lens 12 is very far from the in-focus point. However, that information does not indicate whether the imaging lens 12 is in front focus or in rear focus or how far the imaging lens 12 is from the in-focus point F3. In order to determine that additional information, the first and second focus state detecting elements A and B are positioned on even shorter and even longer optical paths from that of the third focus state detecting element C so that the differences in optical path lengths being considered is increased.

Figure 5:
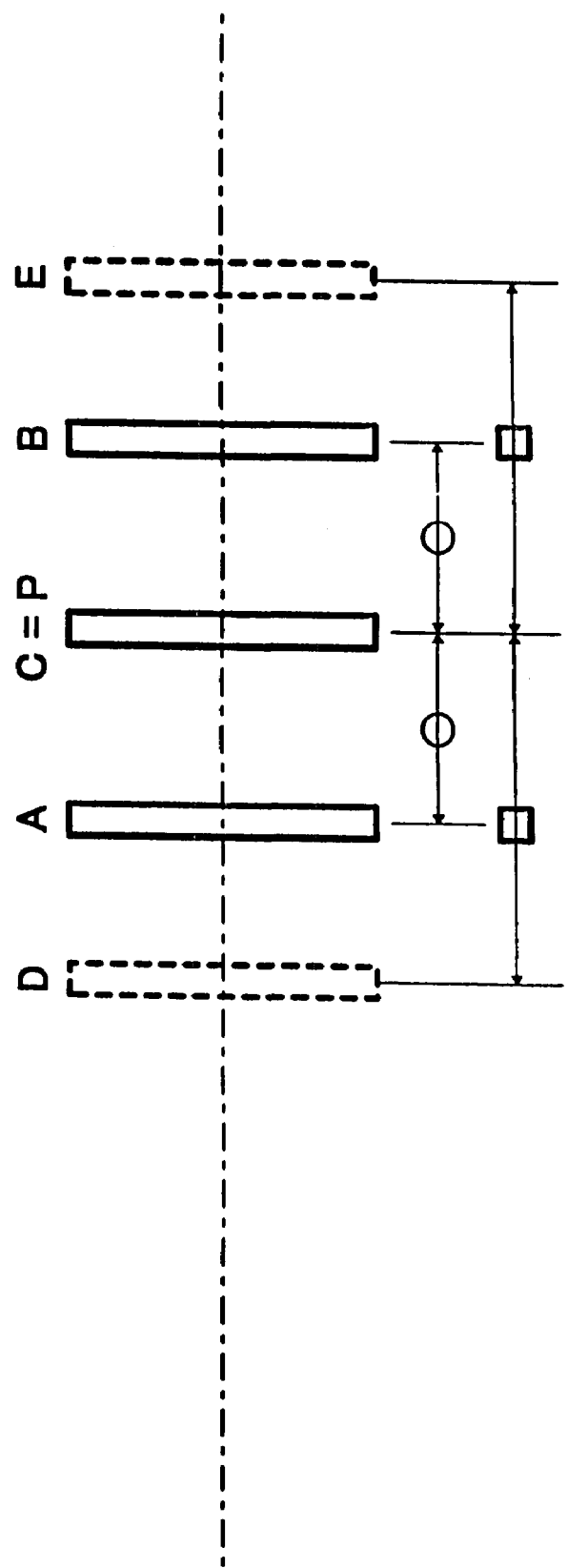
FIG. 5 shows, for purposes of explanation of operation only, the image detecting planes for three focus state detecting elements, represented as five focus state detecting elements, being drawn as positioned along the same straight line; however, in actuality these image detecting planes are positioned, for example, as shown in FIG. 1.
Figure 6:
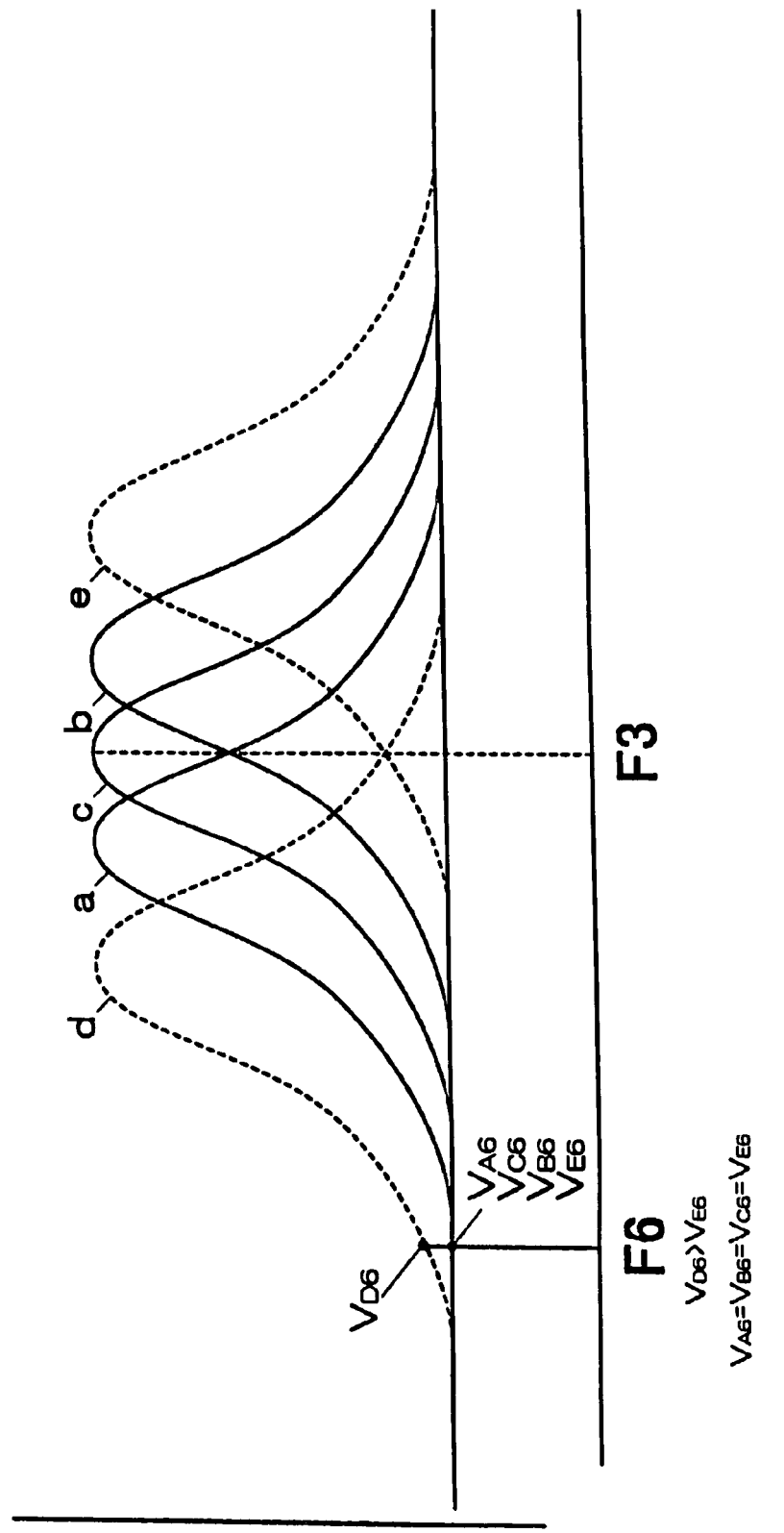
FIG. 6 is a graph with focus position as the X-axis and evaluation values as the Y-axis of an AF system of Embodiment 1 of the present invention.

To explain the operation, suppose that, as shown in FIG. 5, two focus state detecting elements D and F were provided on longer and shorter optical paths than the first and second focus state detecting elements A and B, respectively. The focus state detecting elements D and E would yield evaluation values as shown by the curves d and e in FIG. 6. When the focus position of the imaging lens 12 is at F6, that is very close on the close-up side of the in-focus point F3, the evaluation values obtained by the focus state detecting elements A-E would be $V_{A6}$-$V_{E6}$ on the curves a-e at F6. In this case, the evaluation values $V_{A6}$ and $V_{B6}$ obtained from the first and second focus state detecting elements A and B would be equal, therefore failing to show an in-focus position of the imaging lens 12. However, the evaluation value $V_{D6}$ obtained from the focus state detecting element D would be larger than the evaluation value $V_{E6}$ obtained from the focus state detecting element E. Thus, it could be determined from the comparison of the evaluation values $V_{D6}$ and $V_{E6}$ that the focus position of the imaging lens 12 was very close on the close-up side of the in-focus point. Thus, the use of two focus state imaging detecting elements at increased distances in front of and behind an in-focus point, and at increased distances from one another, would enable the focus state of the imaging lens 12 to be determined even when the focus setting is far from the in-focus point.

However, the first and second focus state detecting elements A and B of Embodiment 1 of the present invention are at fixed distances from one another so that the difference in optical path length between the two focus state detecting elements A and B cannot be increased. Therefore, the image position shift lens 26 is used to shift the image position of the focus state detecting object light so that image signals that are equivalent to those of an increased difference in optical path lengths between the first and second focus state detecting elements A and B are obtained. This is accomplished as described below.

Figure 7:
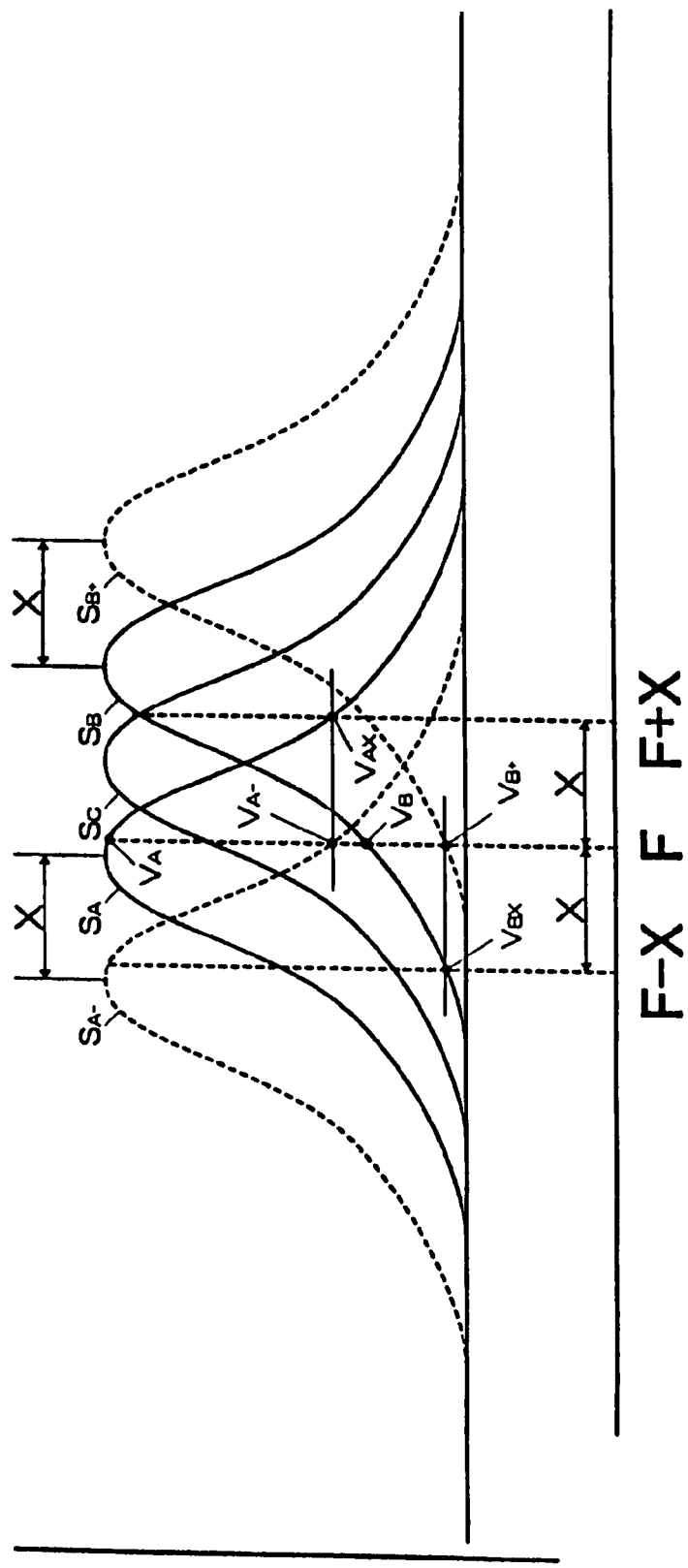
FIG. 7 is a graph with focus position as the X-axis and evaluation values as the Y-axis of an AF system of Embodiment 1 of the present invention.

FIG. 7 is a graph with focus position of an image of an object as the X-axis and evaluation values of focus state detecting elements A, B, and C as the Y-axis of an AF system of Embodiment 1 of the present invention. In FIG. 7, the solid lines $S_A$, $S_B$, and $S_C$ represent the evaluation values of focus state detecting elements A, B, and C in relation to the focus positions. In FIG. 7, the focus position of the imaging lens 12 is at F. The evaluation values obtained by the focus state detecting elements A, B are $V_A$ and $V_B$ on the curves $S_A$ and $S_B$ at F.

Then, suppose that the first focus state detecting element A is moved to a point where the optical path length is shortened by X and the second focus state detecting element B is moved to a point where the optical path length is lengthened by X. Suppose also, for convenience of description, that the first focus state detecting element A in the position where the optical path length is shortened by X is termed the first focus state detecting element A− and the second focus state detecting element B that is moved to a point where the optical path length is lengthened by X is termed the second focus state detecting element B+ (even though the terms A− and B+ really represent particular positions of the focus state detecting elements. A and B). In that case, the first and second focus state detecting elements A− and B+ yield evaluation values shown by the dotted curves $S_{A-}$ and $S_{B+}$ in FIG. 7. If the focus position of the imaging lens 12 is at F, the evaluation values obtained by the first and second focus state detecting elements A− and B+ are $V_{A-}$ and $V_{B+}$ on the curves $S_{A-}$ and $S_{B+}$ at F, respectively.

In fact, the same evaluation values as those obtained when the focus state detecting elements A and B are moved as described above, may be obtained by shifting the image position of the focus state detecting object light. As shown in FIG. 7, the image position shift lens 26 is moved to shift the image position of the focus state detecting element object light from F to F−X, a point shifted to the close-up side by X. The second focus state detecting element B is used to obtain an evaluation value at this position. The first focus state detecting element A is not used to obtain an evaluation value. The evaluation value obtained by the second focus state detecting element B is $V_{BX}$ on the curve $S_B$ at F−X. This is equal to the evaluation value $V_{B+}$ that would be obtained if the second focus state detecting element B were moved to have a longer optical path by X, that is, the evaluation value $V_{B+}$ obtained by the second focus state detecting element B+ ($V_{BX}=V_{B+}$).

Then, the image position shift lens 26 is moved in the opposite direction to shift the image position of the focus state detecting object light from F to F+X, a position shifted to the infinity side by X. The first focus state detecting element A is used to obtain an evaluation value at this position. The second focus state detecting element B is not used to obtain an evaluation value. The evaluation value obtained by the first focus state detecting element A is $V_{AX}$ on the curve $S_A$ at F+X. This is equal to the evaluation value that is obtained when the first focus state detecting element A is moved to have a shorter optical path by X, that is, the evaluation value $V_{A-}$ obtained by the first focus state detecting element A− ($V_{AX}=V_{A-}$).

In this way, the image position of the focus state detecting object light is moved forward and backward by the same distance to obtain an evaluation value at each position. This provides evaluation values that are equivalent to evaluation values obtained with an increased difference in optical path length between the focus state detecting elements A and B.

The example above is a case where the difference in optical path length between the focus state detecting elements is increased. Conversely, the difference in optical path length between the focus state detecting elements can be reduced. In such a case, evaluation values can be obtained as follows.

Figure 8:
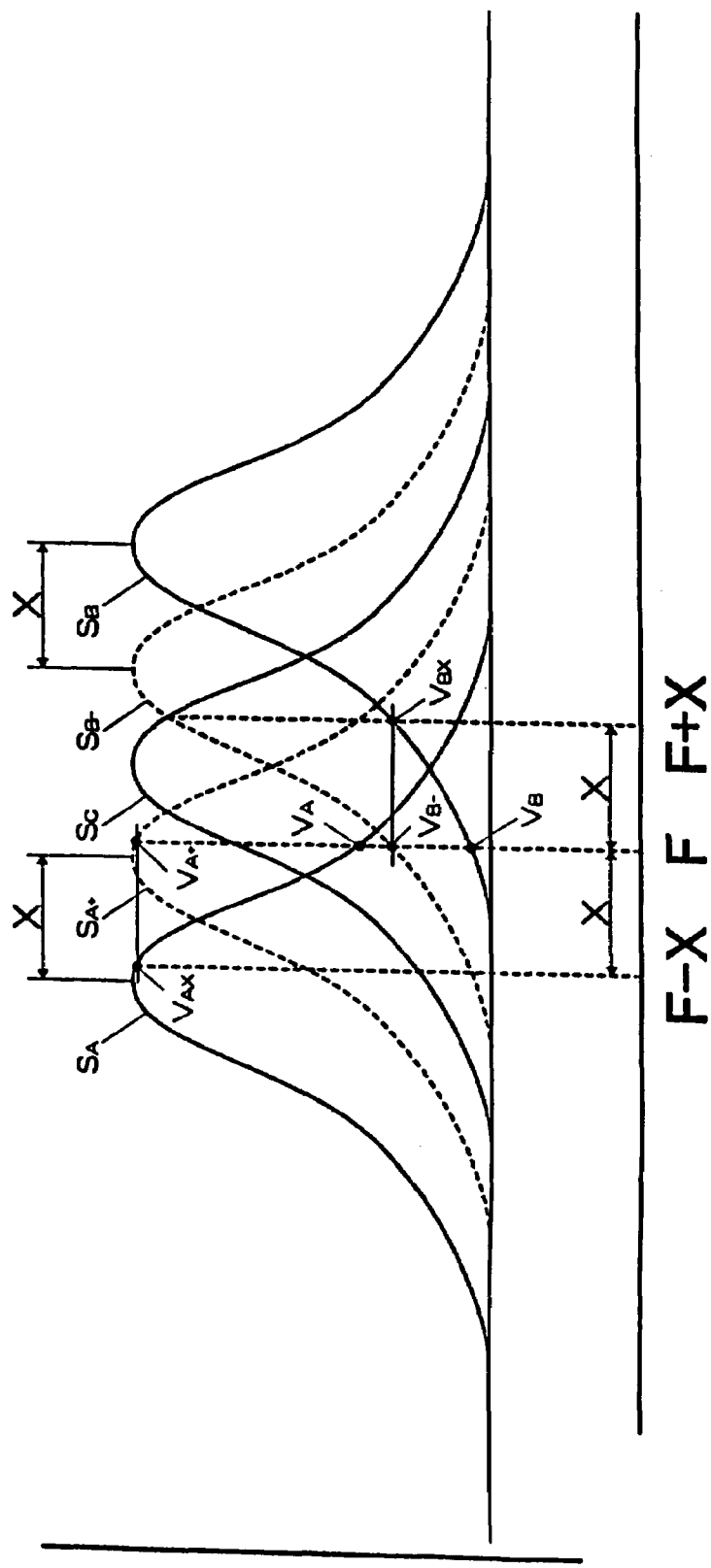
FIG. 8 is a graph with focus position as the X-axis and evaluation values as the Y-axis of an AF system of Embodiment 1 of the present invention.

FIG. 8 is a graph with X-axis representing focus positions of an image of an object and the Y-axis being evaluation values of focus state detecting elements A, B and C of an AF system of Embodiment 1 of the present invention. In FIG. 8, the solid curves $S_A$, $S_B$, and $S_C$ represent the evaluation values of focus state detecting elements A, B, and C in relation to the focus positions. In FIG. 8, the focus position of the imaging lens 12 is at F. The evaluation values obtained by the focus state detecting elements A and B are $V_A$ and $V_B$, on the curves $S_A$ and $S_B$ at F.

Then, suppose that the focus state detecting element A is moved to a point where the optical path length is lengthened by X and the second focus state detecting element B is moved to a point where the optical path length is shortened by X. Suppose also, for convenience of description, that the first focus state detecting element in the position where the optical path length is lengthened by X is termed the first focus state detecting element A+ and the second focus state detecting element B that is moved to a point where the optical path length is shortened by X is termed the second focus state detecting element B−. The first and second focus state detecting elements A+ and B− yield evaluation values as shown by the dotted curves $S_{A+}$ and $S_{B-}$ in FIG. 8. If the focus position of the imaging lens 12 is at F, the evaluation values obtained by the first and second focus state detecting elements A+ and B− are $V_{A-}$ and $V_{B-}$ on the curves $S_{A+}$ and $S_{B-}$ at F, respectively.

In fact, the same evaluation values as those obtained when the focus state detecting elements A and B are moved as described above may be obtained by shifting the image position of the focus state detecting object light. As shown in FIG. 8, the image position shift lens 26 is moved to shift the image position of the focus state detecting object light from F to F−X, a point shifted to the close-up side by X. The first focus state detecting element A is used to obtain an evaluation value at this position. The second focus state detecting element B is not used to obtain an evaluation value. The evaluation value obtained by the first focus state detecting element A is $V_{AX}$ on the curve $S_A$ at F−X. This is equal to the evaluation value that would be obtained if the first focus state detecting element A were moved to have a longer optical path by X, that is, the evaluation value $V_{A+}$ obtained by the first focus state detecting element A+ ($V_{AX}=V_{A+}$).

Then, the image position shift lens 26 is moved in the opposite direction to shift the image position of the focus state detecting object light from F to F+X, a point shifted to the infinity side by X. The second focus state detecting element B is used to obtain an evaluation value at this position. The first focus state detecting element A is not used to obtain an evaluation value. The evaluation value obtained by the second focus state detecting element B is $V_{BX}$ on the curve $S_B$ at F+X. This is equal to the evaluation value $V_B$ that would be obtained if the second focus state detecting element B were moved to have a shorter optical path by X, that is, the evaluation value $V_{B-}$ obtained by the second focus state detecting element B− ($V_{BX}=V_{B-}$).

In this way, the image position of the focus state detecting object light is moved forward and backward by the same distance to obtain an evaluation value at each position. This provides evaluation values that are equivalent to evaluation values obtained with a decreased difference in optical path length between the focus state detecting elements A and B. The reduced difference in optical path length between the focus state detecting elements A and B provides more information on evaluation values that assists in more precise focusing of the imaging lens 12.

The larger the iris or diaphragm opening or setting of the imaging lens 12, the smaller the peak values and the smoother the evaluation value curves will be overall. Therefore, with a large iris or diaphragm setting or opening, an increase in the effective optical path length between focus state detecting elements A and B is especially helpful in obtaining precise focusing. Thus, the difference in the effective optical path length between the focus state detecting elements A and B is preferably changed according to the diaphragm setting or opening. The focusing control process according to the diaphragm setting or opening is described below with reference to FIG. 9.

Figure 9:
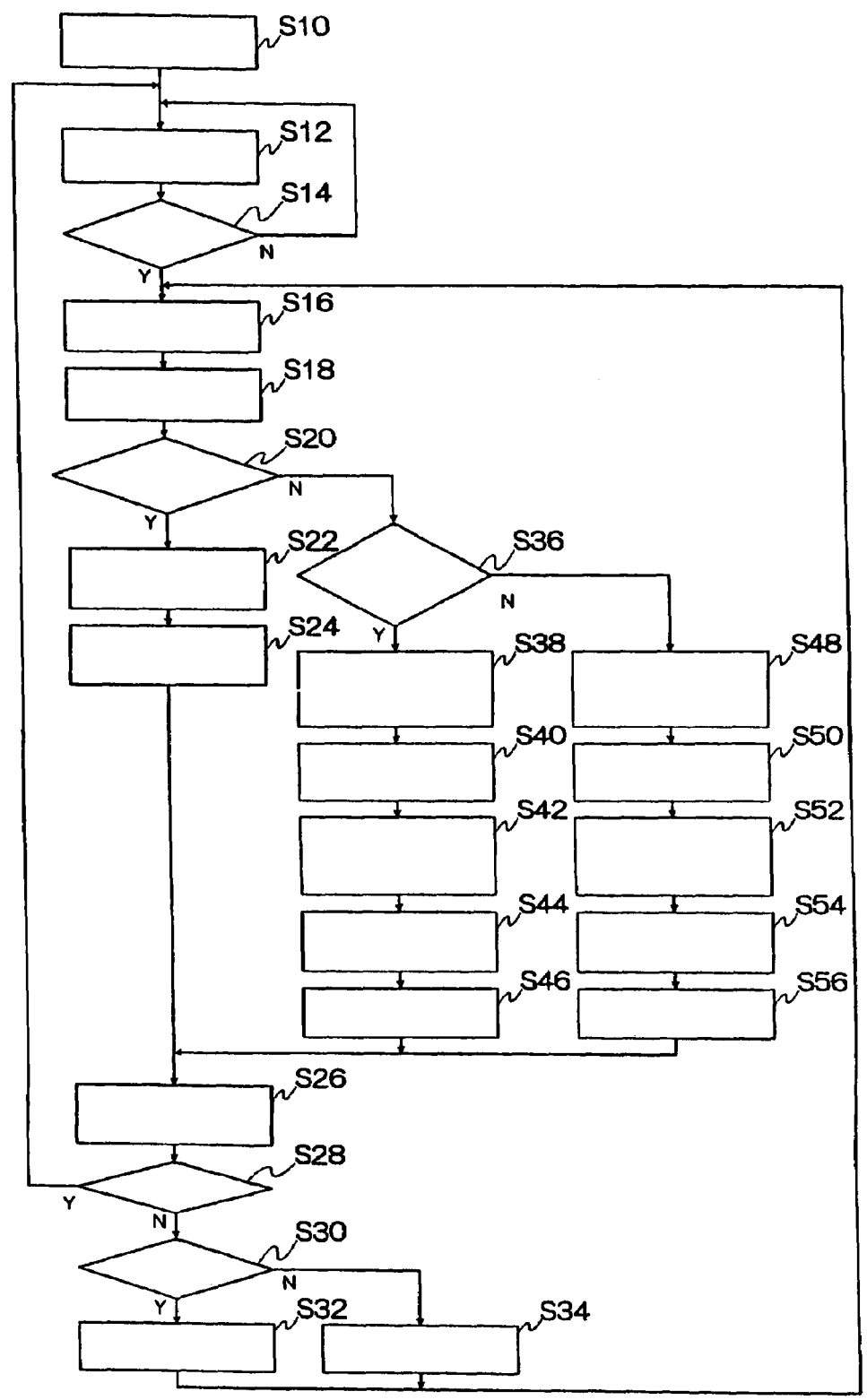
FIG. 9 is a flow chart of a process of executing focus control of an AF system of Embodiment 1 of the present invention.

FIG. 9 is a flow chart of a process of executing focus control of an AF system of Embodiment 1 of the present invention. As shown in FIG. 9, after necessary initialization (Step S10), the CPU 46 executes necessary procedures other than AF control, such as controlling of the iris or diaphragm 20 (FIG. 1) of the imaging lens 12 based on control signals from the camera body 10 and controlling zooming of the imaging lens 12 based on the zoom demand data from the zoom command circuit 50 (Step S12). Then, the CPU 46 checks to determine if the AF switch 48 (FIG. 3) is set to ON or OFF (Step S14). The CPU 46 executes the following AF control if the AF switch is ON.

First, the CPU 46 acquires the current diaphragm opening or setting data of the imaging lens 12 from the iris potentiometer 58 (Step S16). Then, it calculates the optimum optical path length difference between the focus state detecting elements A and B based on the acquired diaphragm opening or setting data (Step S18). Then, the CPU 46 compares the calculated optimum optical path length difference with the current optical path length difference (Step S20).

If the current optical path length difference is found to be sufficient as a result of the comparison, the optical path length is not changed and the focus state detection is performed in a standard manner based on the evaluation values obtained by the first and second focus state detecting elements A and B. In that case, an evaluation value $V_A$ obtained by the first focus state detecting element A is first acquired (Step S22) and an evaluation value $V_B$ obtained by the second focus state detecting element B is then acquired (Step S24). The acquired evaluation values $V_A$ and $V_B$ of the first and second focus state detecting elements A and B are compared (Step S26) to determine whether an in-focus state is achieved (Step S28).

In order to determine whether in-focus is achieved, the difference $\Delta V_{A-B}$ between the evaluation values $V_A$ and $V_B$ of the first and second focus state detecting elements A and B is calculated. An in-focus state is confirmed if the difference $\Delta V_{A-B}$ is zero and an in-focus state is denied if not. When an in-focus state is determined, manual focusing control is performed until the AF switch is turned on again.

Conversely, when an in-focus state is denied, AF focusing control is executed. First, the desired shift direction of the focusing lens group 16 is determined based on the evaluation values $V_A$ and $V_B$ of the first and second focus state detecting elements A and B (Step S30). Then, the evaluation value difference $\Delta V_{A-B}$ is used as a shift amount to move the focusing lens group 16. For example, if the focus is shifted to the infinity side, the focusing lens group 16 is moved to the close-up side with the evaluation value difference $\Delta V_{A-B}$ as the shift amount that controls the amount of movement of the focusing lens group 16 (Step S32). If the focus is shifted to the close-up side, the focusing lens group 16 is moved to the infinity side with the evaluation value difference $\Delta V_{A-B}$ as the shift amount that controls the amount of movement of the focusing lens group 16 (Step S34). This process is repeated until the difference $\Delta V_{A-B}$ between the evaluation values $V_A$ and $V_B$ of the first and second focus state detecting elements A and B becomes zero. In this way, the camera lens is focused on the object and an object image is formed on the image detecting surfaces of the image sensor of the image pickup unit 14.

Returning to Step S20, if the current optical path length difference is found to be insufficient in Step S20, the CPU 46 compares the current optical path length difference with the obtained optimum optical path length difference to determine whether the current optical path length difference is smaller than the optimum optical path length difference or not (Step S36). If it is determined that the current optical path length difference is smaller than the optimum optical path length difference, that is, that the distance between the light receiving surfaces of the first and second image detecting elements A and B is smaller than the optimum distance, the CPU 46 instructs moving the image position of the focus state detecting object light to the infinity side by a specified amount so as to obtain the optimum optical path length difference (Step S38). Here, control signals are supplied to the image position shift motor driving circuit 32D via the D/A converter 64 to drive the image position shift motor 32C and, accordingly, move the image position shift lens 26 from the reference position by a specified amount. As a result, the image position of the focus state detecting object light is moved to the infinity side by a specified amount.

Then, an evaluation value $V_A$ of the first focus state detecting element A based on image signals of the first image detecting element A at the shifted position is acquired (Step S40). Here, an evaluation value $V_B$ of the second focus state detecting element B is not acquired. Using the evaluation value $V_A$ of the first focus state detecting element A, the CPU 46 instructs moving the image position of the focus state detecting object light to the close-up side by the same specified amount (Step S42). Here, control signals are supplied to the image position shift motor driving circuit 32D via the D/A converter 64 to drive the image position shift motor 32C and, accordingly, move the image position shift lens 26 from the reference position by the same amount but in the opposite direction. As a result, the image position of the focus state detecting object light is moved to the close-up side by the same amount.

Then, an evaluation value $V_B$ of the second focus state detecting element B based on image signals picked up by the second focus state detecting element B at the shifted position is acquired (Step S44). Here, an evaluation value $V_A$ of the first focus state detecting element A is not acquired. Using the evaluation value $V_B$ of the second focus state detecting element B, the CPU 46 supplies control signals to the image position shift motor driving circuit 32D via the D/A converter to drive the image position shift motor 32C and, accordingly, restore the image position shift lens 26 to the reference position (Step S46).

Following this, the CPU 46 performs the focus state detection based on the acquired evaluation values $V_A$ and $V_B$ of the first and second focus state detecting elements A and B by comparing the acquired evaluation values $V_A$ and $V_B$ of the first and second focus state detecting elements A and B (Step S26) and determining whether the in-focus state is achieved (Step S28). Based on the results, the focusing control is performed and the procedure above is repeated until the in-focus state is achieved.

Returning to Step S36, if it is determined at Step S36 that the current optical path length difference is larger than the optimum optical path length difference, that is, that the distance between the first and second focus state detecting elements A and B is larger than the optimum distance, the CPU 46 provides instructions for moving the image position of the focus state detecting object light to the close-up side by a specified amount so as to obtain the optimum optical path length difference (Step S48). Here, control signals are supplied to the image position shift motor driving circuit 32D via the D/A converter 64 to drive the image position shift motor 32C and, accordingly, move the image position shift lens 26 from the reference position by a specified amount. As a result, the image position of the focus state detecting object light is moved to the close-up side by a specified amount.

Then, an evaluation value $V_A$ of the first focus state detecting element A, based on image signals of the first focus state detecting element A at the shifted position, is acquired (Step S50). Here, an evaluation value $V_B$ of the second focus state detecting element B is not acquired. Using the evaluation value $V_A$ of the first focus state detecting element A, the CPU 46 provides instructions for moving the image position of the focus state detecting object light to the infinity side by the same specified amount (Step S52). Here, control signals are supplied to the image position shift motor driving circuit 32D via the D/A converter 64 to drive the image position shift motor 32C and, accordingly, move the image position shift lens 26 from the reference position by the same specified amount but in the opposite direction. As a result, the image position of the focus state detecting object light is moved to the infinity side by the same amount.

Then an evaluation value $V_B$ of the second focus state detecting element B, based on image signals picked up by the second focus state detecting element B at the shifted position, is acquired (Step S54). Here, an evaluation value $V_A$ of the second focus state detecting element A is not acquired. Using the evaluation value $V_B$ of the second focus state detecting element B, the CPU 46 supplies control signals to the image position shift motor driving circuit 32D via the D/A converter 64 so as to drive the image position shift motor 32C and, accordingly, restore the image position shift lens 26 to the reference position (Step S56).

Following this, the CPU 46 performs the focus state detection based on the acquired evaluation values $V_A$ and $V_B$ of the first and second focus state detecting elements A and B by comparing the acquired evaluation values $V_A$ and $V_B$ of the first and second focus state detecting elements A and B (Step S26) and determining whether the in-focus state is achieved (Step S28). Based on the result, the focusing control is performed and the procedure above is repeated until the in-focus state is achieved.

In this way, the effective optical path length difference between the focus state detecting elements A and B can be changed according to the diaphragm setting or opening. This allows modifying the effective difference in optical path length according to the profile of the evaluation value curves. Thus, highly precise focus checking is provided.

By using a pair of focus state detecting elements, A and B, only small shifts in the position of the image position shift lens 26 is required, which allows rapid determinations of the focus state. Although the procedure above determines the focus state based on evaluation values of the first and second focus state detecting elements, evaluation values of the third focus state detecting element C can also be similarly used to determine the focus state.

For example, using the third focus state detecting element C, evaluation values of the focus state detecting elements A, B, and C may be compared. If they are equal, indicating a highly out of focus camera lens 16, the effective optical path length difference between the focus state detecting elements A and B is increased and the focus state again determined. This allows precise focusing even when the camera lens 16 is far out of focus.

At least one pair of focus state detecting elements, such as A and B, are required. However, a second pair of focus state detecting elements could be added.

EMBODIMENT 2

Figure 10:
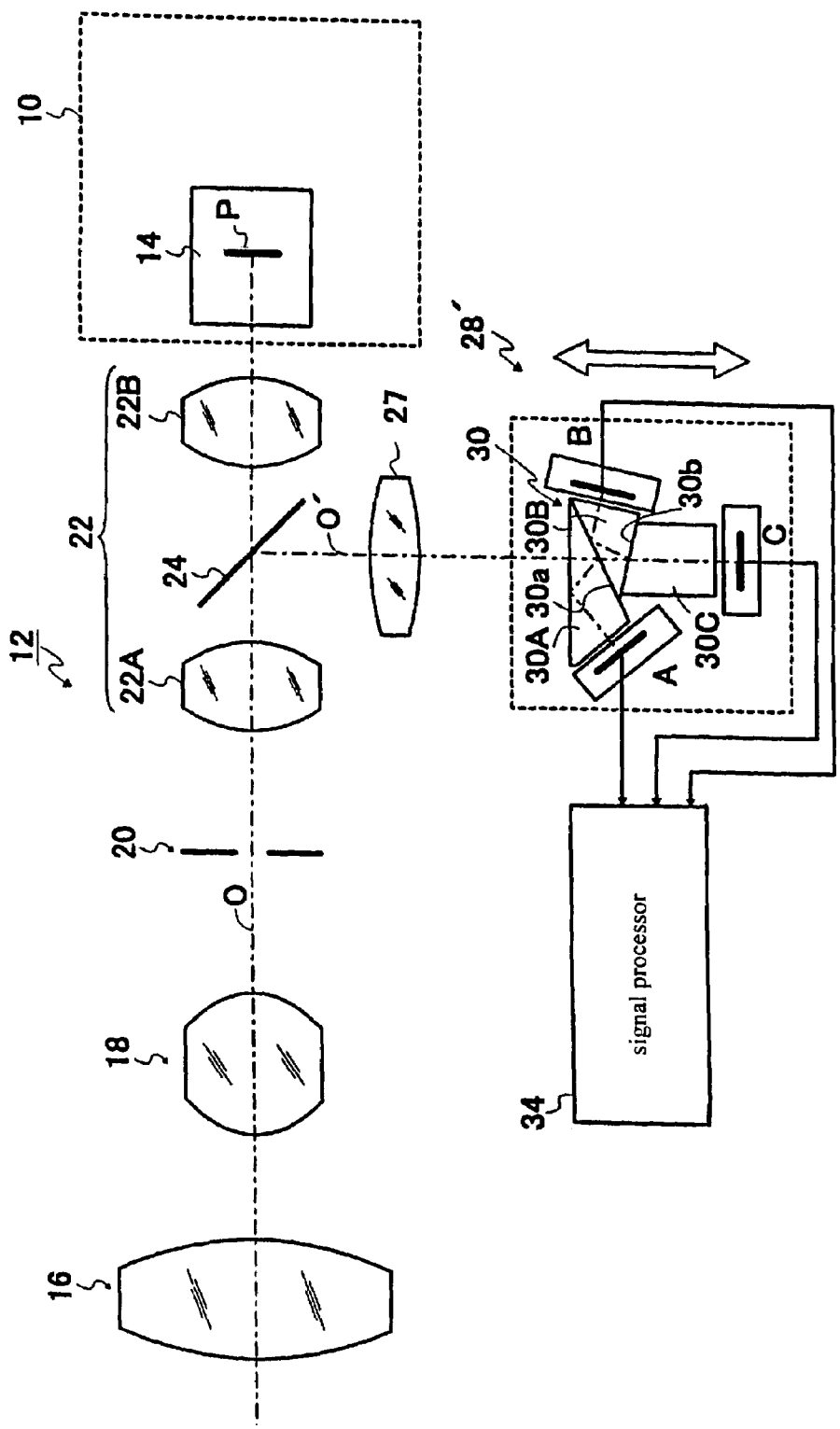
FIG. 10 shows a cross-sectional view of a camera using an AF system of Embodiment 2 of the present invention.

FIG. 10 shows a cross-sectional view of a camera using an AF system of Embodiment 2 of the present invention. The same reference numbers are given to the same components as in the camera system of Embodiment 1. Because Embodiment 2 is similar to Embodiment 1, primarily only differences between Embodiment 2 and Embodiment 1 will be explained for Embodiment 2.

As shown in FIG. 10, the camera system of Embodiment 2 includes a focus state detection unit 28' that is free to move forward and backward along the optical axis O'. The focus state detection unit 28' is moved as a single unit by a driving unit (not shown) along the optical axis O'. The focus state detecting object light that is reflected by the partially reflecting mirror 24 enters the focus state detection unit 28' via the relay lens 27 that is located at a fixed position. Thus, in Embodiment 2 the focus state detection unit 28' moves to change the effective optical path length difference between the focus state detecting elements and the relay lens 27 is stationary, whereas in Embodiment 1 the focus state detection unit is stationary and the relay lens 26 moves to change the effective optical path length difference between the focus state detecting elements.

The camera system of Embodiment 2 with the configuration above performs a focusing check as follows. When the camera lens is set for a large diaphragm setting or opening and, therefore, an increased optical path length difference between the first and second focus state detecting elements A and B is desirable in order to ensure highly precise focus state detection, the entire focus state detection unit 28' is first moved to the close-up side, that is, toward the partially reflecting mirror 24, by a specified amount. An evaluation value $V_A$ of the first focus state detecting element A is acquired at this position. An evaluation value $V_B$ of the second focus state detecting element B is not acquired at this time.

After the evaluation value $V_A$ of the first focus state detecting element A is acquired, the entire focus state detection unit 28' is moved to the infinity side, that is, away from the partially reflecting mirror 24, by the same amount. An evaluation value $V_B$ of the second focus state detecting element B is acquired at this position. An evaluation value $V_A$ of the first focus state detecting element A is not acquired at this time. Then, the focusing control is performed based on the acquired evaluation values $V_A$ and $V_B$ of the first and second focus state detecting elements A and B.

When the camera lens is set at a small diaphragm setting or opening and, therefore, a decreased optical path length difference between the first and second focus state detecting elements A and B ensures highly precise focusing check, the entire focus state detection unit 28' is first moved to the infinity side, that is, away from the partially reflecting mirror 24, by a specified amount. An evaluation value $V_A$ of the first focus state detecting element A is acquired at this position. An evaluation value $V_B$ of the second focus state detecting element B is not acquired at this time.

After the evaluation value $V_A$ of the first focus state detecting element A is acquired, the entire focus state detection unit 28' is moved to the close-up side, that is, toward the partially reflecting mirror 24 by the same specified amount. An evaluation value $V_B$ of the second focus state detecting element B is acquired at this position. An evaluation value $V_A$ of the first focus state detecting element A is not acquired at this time. Then, the focusing control is performed based on the acquired evaluation values $V_A$ and $V_B$ of the first and second focus state detecting elements A and B.

For changing the effective optical path length difference, it is preferred that the optimum optical path length difference be calculated based on the diaphragm setting or opening as in Embodiment 1 above and that the optical path length difference be modified to be equal to the optimum optical path length difference. In this way, the focus state detection unit 28' moves as one piece forward and backward along the optical axis O' of the focus state detecting object light by the same amount, with an evaluation value being acquired at each position. This provides evaluation values that are equivalent to evaluation values obtained with an increased difference in optical path length between the focus state detecting elements A and B.

The invention being thus described, it will be obvious that the same may be varied in many ways. For instance, the present invention may be used with all types of imaging systems, including camera systems that include a camera body and an imaging lens, including video cameras or similar cameras, still cameras that take static or single frame images, moving picture cameras, and including television cameras and photographic cameras. Additionally, although the embodiments above include a third focus state detecting element, that is not necessary. Two focus state detecting elements are sufficient to implement the invention. Therefore, the third focus state detecting element may be omitted. Further, although preferably equal amounts of light are provided to the light receiving surfaces of the focus state detecting elements, different amounts of light may be used, and, for example, the evaluation values adjusted by weighing factors inversely proportional to the relative amounts of light before a comparison is made. Also, although preferably evaluation values for comparison are determined at positions where the relay lens and the focus state detection unit are moved forward and backward relative to positions where the optical path length differences between the optical path lengths to each of the light receiving surfaces of each of the focus state detecting elements and the optical path length to a position conjugate with the light receiving surface of the image detecting element for image production are equal in magnitude and opposite in sign, that arrangement may be varied. For example, different optical path length differences might be used and the evaluation values adjusted by weighting factors, as discussed above, or different amounts of light may be directed to the different light receiving surfaces of the focus state detecting elements, as discussed above, to similarly adjust for the different optical path length differences. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A focus detecting system for determining the focus state of an imaging lens in an imaging system that includes a location along a first optical axis of the imaging lens where focus state detecting object light is separated from object light that passes through the imaging lens to be incident on a light receiving surface of an image detecting element for image production, the focus detecting system comprising:

a relay lens for receiving said focus state detecting object light, wherein the relay lens defines a second optical axis for intersecting the first optical axis;

a focus state detection unit that includes two focus state detecting elements, each focus state detecting element including a light receiving surface, and light dividing means for dividing light that passes through said relay lens to direct some of the light toward each of the light receiving surfaces of each of the two focus state detecting elements so that the optical path length along the second optical axis to the light receiving surface of one of the focus state detecting elements is unequal to the optical path length along the second optical axis to the light receiving surface of the other focus state detecting element;

means for moving the relay lens relative to the focus state detection unit along the second optical axis while keeping said image detecting element for image production at a fixed position;

evaluation means for obtaining an evaluation value indicative of the sharpness of an image at the light receiving surface of a second one of the two focus state detecting elements at a first relative position of the relay lens and the focus state detection unit along the second optical axis while not using the first one of the two focus state detecting elements and for obtaining an evaluation value indicative of the sharpness of an image at the light receiving surface of the first one of the two focus state detecting elements at a second relative position of the relay lens and the focus state detection unit along the second optical axis while not using the second one of the two focus state detecting elements; and comparison means for comparing the evaluation values obtained by the evaluation means at the two relative positions.

2. The focus detecting system of claim 1, wherein the means for moving is designed to move said relay lens along the second optical axis while the focus state detection unit remains stationary.

3. The focus detecting system of claim 1, wherein said means for moving is designed to move the focus state detection unit along the second optical axis while said relay lens remains stationary.

4. The focus detecting system of claim 1, wherein the imaging lens includes a diaphragm having an opening for controlling the amount of light that passes through the imaging lens, and whether said means for moving moves said relay lens relative to the focus state detection unit along the second optical axis is determined by the setting of the opening of the diaphragm.

5. The focus detecting system of claim 4, wherein the amount of movement of said relay lens relative to the focus state detection unit varies with the setting of the opening of the diaphragm.

6. The focus detecting system of claim 2, wherein the imaging lens includes a diaphragm having an opening for controlling the amount of light that passes through the imaging lens, and whether said means for moving moves said relay lens along the second optical axis depends on the setting of the opening of the diaphragm.

7. The focus detecting system of claim 6, wherein the amount of movement of said relay lens relative to said point along the second optical axis varies with the setting of the opening of the diaphragm.

8. The focus detecting system of claim 3, wherein the imaging lens includes a diaphragm having an opening for controlling the amount of light that passes through the imaging lens, and whether said means for moving moves the focus state detection unit along the second optical axis depends on the setting of the opening of the diaphragm.

9. The focus detecting system of claim 8, wherein the amount of movement of the focus state detection unit along the second optical axis varies with the setting of the opening of the diaphragm.

10. The focus detecting system of claim 1, wherein an in-focus state of the imaging lens is determined when a point along the second optical axis that is in a plane that is optically conjugate with the light receiving surface of the image detecting element for image production is halfway between the two relative positions.

11. The focus detecting system of claim 2, wherein an in-focus state of the imaging lens is determined when a point along the second optical axis that is in a plane that is optically conjugate with the light receiving surface of the image detecting element for image production is halfway between the two relative positions.

12. The focus detecting system of claim 3, wherein an in-focus state of the imaging lens is determined when a point along the second optical axis that is in a plane that is optically conjugate with the light receiving surface of the image detecting element for image production is halfway between the two relative positions.

13. The focus detecting system of claim 4, wherein an in-focus state of the imaging lens is determined when a point along the second optical axis that is in a plane that is optically conjugate with the light receiving surface of the image detecting element for image production is halfway between the two relative positions.

14. The focus detecting system of claim 5, wherein an in-focus state of the imaging lens is determined when a point along the second optical axis that is in a plane that is optically conjugate with the light receiving surface of the image detecting element for image production is halfway between the two relative positions.

15. The focus detecting system of claim 6, wherein an in-focus state of the imaging lens is determined when a point along the second optical axis that is in a plane that is optically conjugate with the light receiving surface of the image detecting element for image production is halfway between the two relative positions.

16. The focus detecting system of claim 7, wherein an in-focus state of the imaging lens is determined when a point along the second optical axis that is in a plane that is optically conjugate with the light receiving surface of the image detecting element for image production is halfway between the two relative positions.

17. The focus detecting system of claim 8, wherein an in-focus state of the imaging lens is determined when a point along the second optical axis that is in a plane that is optically conjugate with the light receiving surface of the image detecting element for image production is halfway between the two relative positions.

18. The focus detecting system of claim 9, wherein an in-focus state of the imaging lens is determined when a point along the second optical axis that is in a plane that is optically conjugate with the light receiving surface of the image detecting element for image production is halfway between the two relative positions.

* * * * *